United States Patent
Inagaki et al.

(10) Patent No.: US 10,233,770 B2
(45) Date of Patent: Mar. 19, 2019

(54) POSITION ADJUSTMENT DEVICE, ROTATING MACHINE PROVIDED WITH SAME, AND POSITION ADJUSTMENT METHOD

(71) Applicant: MITSUBISHI HITACHI POWER SYSTEMS, LTD., Kanagawa (JP)

(72) Inventors: Hiroshi Inagaki, Tokyo (JP); Akihiko Shirota, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 507 days.

(21) Appl. No.: 15/106,516

(22) PCT Filed: Jan. 21, 2015

(86) PCT No.: PCT/JP2015/051538
§ 371 (c)(1),
(2) Date: Jun. 20, 2016

(87) PCT Pub. No.: WO2015/111620
PCT Pub. Date: Jul. 30, 2015

(65) Prior Publication Data
US 2016/0341069 A1    Nov. 24, 2016

(30) Foreign Application Priority Data

Jan. 27, 2014   (JP) .................... 2014-012768

(51) Int. Cl.
*F01D 9/04* (2006.01)
*F01D 17/14* (2006.01)
(Continued)

(52) U.S. Cl.
CPC ............. *F01D 17/143* (2013.01); *F01D 5/02* (2013.01); *F01D 9/04* (2013.01); *F01D 25/246* (2013.01);
(Continued)

(58) Field of Classification Search
CPC ........ F01D 17/143; F01D 17/145; F01D 5/02; F01D 9/04; F01D 25/246; F01D 25/26;
(Continued)

(56) References Cited

U.S. PATENT DOCUMENTS 3,456,184 A    7/1969  Kopezynski
3,498,727 A *  3/1970  Bollinger, Jr. ........ B60T 8/3235
                                                    415/136
(Continued)

FOREIGN PATENT DOCUMENTS

JP    63-170505    7/1988
JP     64-4804     1/1989
(Continued)

OTHER PUBLICATIONS

International Search Report dated Apr. 21, 2015 in corresponding International Application No. PCT/JP2015/051538 (with English translation).

(Continued)

*Primary Examiner* — Jason D Shanske
*Assistant Examiner* — Joshua R Beebe
(74) *Attorney, Agent, or Firm* — Wenderoth, Lind & Ponack, L.L.P.

(57) ABSTRACT

A position adjustment device is provided with an eccentric pin and a push rod. The eccentric pin has a rotating shaft part, and an eccentric shaft part inserted into an end in a circumferential direction of a lower-half inside member. The push rod is inserted into the lower-half inside member from an end surface in the circumferential direction of the lower-half inside member, the push rod being able to come into contact with the eccentric shaft part within the lower-half inside member. The rotating shaft part has a columnar shape with a rotational axis line. The eccentric shaft part is formed with: a side peripheral surface that comes into contact with (Continued)

the inner peripheral surface of an eccentric shaft hole in the lower-half inside member into which the eccentric shaft part is inserted, and a rod contact surface that comes into contact with the push rod.

10 Claims, 13 Drawing Sheets

(51) Int. Cl.
    *F04D 17/12*     (2006.01)
    *F04D 29/64*     (2006.01)
    *F01D 25/26*     (2006.01)
    *F02C 7/20*     (2006.01)
    *F01D 5/02*     (2006.01)
    *F01D 25/24*     (2006.01)

(52) U.S. Cl.
    CPC ............... *F01D 25/26* (2013.01); *F02C 7/20* (2013.01); *F04D 17/122* (2013.01); *F04D 29/644* (2013.01); *F05D 2220/31* (2013.01); *F05D 2230/60* (2013.01); *F05D 2230/644* (2013.01)

(58) Field of Classification Search
    CPC ........ F01D 25/243; F02C 7/20; F04D 17/122; F04D 29/644; F05D 2220/31; F05D 2230/60; F05D 2230/644
    See application file for complete search history.

(56) References Cited

U.S. PATENT DOCUMENTS

| | | | | |
|---|---|---|---|---|
| 3,861,827 | A * | 1/1975 | Peabody | F01D 25/246 |
| | | | | 415/199.5 |
| 4,817,417 | A * | 4/1989 | Twerdochlib | F01D 21/003 |
| | | | | 269/71 |
| 7,581,922 | B1 * | 9/2009 | Morimoto | F01D 25/26 |
| | | | | 415/126 |
| 8,870,533 | B2 * | 10/2014 | Casavant | F01D 25/285 |
| | | | | 415/213.1 |
| 2013/0017082 | A1 | 1/2013 | Casavant | |
| 2013/0294907 | A1 * | 11/2013 | Hoffacker | F01D 25/243 |
| | | | | 415/214.1 |

FOREIGN PATENT DOCUMENTS

| | | |
|---|---|---|
| JP | 6-81604 | 3/1994 |
| JP | 9-112204 | 4/1997 |
| JP | 10-77803 | 3/1998 |
| JP | 2004-162536 | 6/2004 |
| JP | 2006-316749 | 11/2006 |

OTHER PUBLICATIONS

Written Opinion of the International Searching Authority dated Apr. 21, 2015 in corresponding International Application No. PCT/JP2015/051538 (with English translation).

* cited by examiner

POSITION ADJUSTMENT DEVICE, ROTATING MACHINE PROVIDED WITH SAME, AND POSITION ADJUSTMENT METHOD

TECHNICAL FIELD

The present invention relates to a position adjustment device that adjusts the position in the vertical direction of a lower-half inside member that forms the lower half of a ring-shaped inside ring disposed on the inner peripheral side of a lower-half outside member, relative to the lower-half outside member that forms the lower half of a cylindrical outside cylinder, a rotating machine provided with the same, and a position adjustment method.

This application claims priority based on Japanese Patent Application No. 2014-12768 filed in Japan on Jan. 27, 2014, of which the contents are incorporated herein by reference.

BACKGROUND ART

Rotating machines, such as steam turbines, gas turbines, compressors, and the like, include a rotor shaft, a cylindrical casing with the rotor shaft at the center thereof, and a ring-shaped vane ring disposed on the inner peripheral side of the casing with the rotor shaft at the center thereof. In such a rotating machine, the cylindrical casing and the ring-shaped vane ring are divided into a plurality of parts in the circumferential direction, from the point of view of assembly, and the like.

Patent Document 1 below discloses a steam turbine that includes the rotor shaft, the casing, and the vane ring. In this steam turbine, the cylindrical casing is configured from an upper-half casing and a lower-half casing, and the vane ring is configured from an upper-half vane ring and a lower-half vane ring. This steam turbine further includes a support fitting for adjusting the position of the lower-half vane ring relative to the lower-half casing.

The support fitting includes a columnar insert section, and a columnar projecting section that is eccentric to the insert section. At each end portion of the lower-half vane ring in the circumferential direction a hole is formed sunk from the outer peripheral side towards the inner peripheral side, and at each end portion of the lower-half casing in the circumferential direction a notch that is depressed from the inner peripheral side towards the outer peripheral side is formed at a position corresponding to the hole of the lower-half vane ring. The columnar insert section is inserted into the hole of the lower-half vane ring so that it can rotate about the central axis thereof as the center, and the columnar projecting section is disposed in the notch of the lower-half casing.

When the support fitting is rotated about the central axis of the projecting section as the center, the insert section that is eccentric to the projecting section revolves about the central axis of the projecting section as the center. Therefore, when the support fitting is rotated about the central axis of the projecting section as the center, the lower-half vane ring into which the insert section of the support fitting is inserted moves relative to the lower-half casing in a direction perpendicular to the central axis of the projecting section.

With the technology disclosed in Patent Document 1, when the support fitting is rotated about the central axis of the projecting section as the center, as described above, the lower-half vane ring moves relative to the lower-half casing, and the position of the lower-half vane ring is adjusted relative to the lower-half casing.

CITATION LIST

Patent Document

Patent Document 1: Japanese Unexamined Patent Application Publication No. S63-170505A

SUMMARY OF INVENTION

Technical Problem

With the technology disclosed in Patent Document 1, a tool for rotating the support fitting is necessary. The tool could be, for example, a hexagonal wrench. In this case, a hexagonal wrench hole that is depressed towards the insert section is formed on the end surface of the columnar projecting section, the end of the hexagonal wrench is inserted into the hexagonal wrench hole, the hexagonal wrench is manipulated, and the support fitting is rotated. Therefore, with the technology disclosed in Patent Document 1, it is necessary to increase the dimension in the radial direction of the notch of the lower-half casing in which the projecting section of the support fitting is disposed, to provide space to install the tool in the projecting section of the support fitting. Therefore, if this support fitting is adopted, it is necessary to increase the outer diameter of the casing that forms the outside cylinder, in order to provide space for the tool. In other words, with the technology disclosed in Patent Document 1, there is the problem that the size of the outside cylinder is increased.

The present invention provides a position adjustment device that adjusts the position in the vertical direction of a lower-half inside member that forms the lower half of an inside ring, relative to a lower-half outside member that forms the lower half of an outside cylinder, without increasing the size of the outside cylinder, and a rotating machine provided with the same.

Solution to Problem

According to a first aspect of the present invention, a position adjustment device that adjusts, relative to a lower-half outside member that forms a lower half of a cylindrical outside cylinder with a rotor axis line as the center, a position in a vertical direction of a lower-half inside member that forms a lower half of a ring-shaped inside ring disposed on an inner peripheral side of the outside cylinder and having the rotor axis line as the center, includes: an eccentric pin that includes a rotating shaft part rotatably supported at an end in a circumferential direction of the lower-half outside member, and an eccentric shaft part inserted into an end in a circumferential direction of the lower-half inside member, the eccentric shaft part rotating integrally with rotation of the rotating shaft part; and a push rod inserted into the lower-half inside member from an end surface in the circumferential direction of the lower-half inside member, the push rod being able to come into contact with the eccentric shaft part within the lower-half inside member. The rotating shaft part has a columnar shape with a rotational axis line that extends in a horizontal direction and in a direction perpendicular to the rotor axis line as the center. The eccentric shaft part is formed with a side peripheral surface that comes into contact with an inner peripheral surface of an eccentric shaft hole in the lower-half inside member into which the eccentric shaft part is inserted, and that has as the center an eccentric axis line that is parallel to the rotational axis line with an offset therebetween, and a rod contact surface that comes into contact with the push rod.

In the position adjustment device, the eccentric shaft part of the eccentric pin revolves about the rotational axis line as the center as the eccentric pin is rotated. Therefore, it is possible to move the lower-half inside member, into which the eccentric shaft part is inserted, in the vertical direction perpendicular to the rotational axis line, relative to the lower-half outside member. Also, in the position adjustment device, the eccentric pin is rotated about the rotational axis line by inserting the push rod into the lower-half inside member from an end surface in the circumferential direction of the lower-half inside member, and pressing the rod contact surface of the eccentric pin with the push rod. Therefore, in the position adjustment device, it is not necessary to engage the tip of a tool from the outside in the radial direction of the eccentric pin and manipulate this tool in order to rotate the eccentric pin about the rotational axis line.

Therefore, in the position adjustment device, it is not necessary to increase the outer diameter of the outside cylinder in order to provide tool space on the outside in the radial direction of the eccentric pin.

Here, in the position adjustment device, a female thread may be formed on an inner peripheral surface of a rod hole in the lower-half inside member into which the push rod is inserted. A male thread capable of mating with the female thread of the rod hole may be formed on an outer periphery of the push rod.

In this position adjustment device, by adjusting the amount that the push rod is screwed in, the amount that the push rod is pressed in is changed, so the position of the lower-half inside member in the vertical direction can be adjusted relative to the lower-half outside member. Therefore, in the position adjustment device, the position of the lower-half inside member in the vertical direction relative to the lower-half outside member can be more simply, accurately, and finely adjusted than by adjusting the amount that simple rods without male threads formed on the outer periphery thereof are pressed in. Moreover, in this position adjustment device, when the relative position adjustment operation is completed and the push rod is left as it is, the amount that the push rod is pressed in does not change as long as the push rod is not rotated.

Also, in any of the position adjustment devices described above, the push rod may include a first push rod that comes into contact with a part of the eccentric shaft part on one side of the eccentric axis line, and a second push rod that comes into contact with a part of the eccentric shaft part on the other side of the eccentric axis line.

In this position adjustment device, the eccentric pin can be rotated in the rotational direction to the one side and to the other side about the eccentric axis line. In addition, if the male thread is formed on the outer periphery of the push rods, when the relative position adjustment operation is completed and the two push rods are left as they are, as long as each push rod is not rotated, the amount that each push rod is pressed in does not change, so the eccentric pin does not rotate. Therefore, after the relative position adjustment operation is completed, it is not necessary to carry out a separate operation to stop the rotation of the eccentric pin, so the working time can be shortened.

Also, in any of the position adjustment devices described above, the eccentric shaft part may include a columnar part having the eccentric axis line as the center, and a notched columnar part formed in a columnar shape with the eccentric axis line as the center and having the same diameter as the columnar part, a part of the column of the notched columnar part being notched. The side peripheral surface of the eccentric shaft part may be a side peripheral surface of the columnar part and the notched columnar part, and the rod contact surface of the eccentric shaft part may be a surface formed by notching the column.

Also, in the position adjustment device in which the eccentric shaft part has the columnar part and the notched columnar part, the rod contact surface of the eccentric shaft part may be a curved surface that is gently recessed towards the side peripheral surface from the notched side of the column in a direction perpendicular to the rotational axis line.

In this position adjustment device, the contact characteristics between the tip of the push rod and the rod contact surface can be maintained, even when the eccentric pin is rotated about the rotational axis line as the center.

Also, any of the position adjustment devices described above may further include a support block which is disposed on the end of the lower-half outside member, and in which a rotating shaft hole is formed into which the rotating shaft part of the eccentric pin is inserted so that the rotating shaft part can rotate about the rotational axis line.

In this position adjustment device, the eccentric pin can be smoothly rotated about the rotational axis line.

Also, the position adjustment device that includes the support block may further include a fixing fitting that fixes the support block to the lower-half inside member.

According to a second aspect of the present invention, a rotating machine includes: any of the position adjustment devices described above; a casing as the outside cylinder; a vane ring as the inside ring; and a rotor disposed within the casing that rotates about the rotor axis line as the center.

According to a third aspect of the present invention, a position adjustment method using any of the position adjustment devices described above for adjusting a position in a vertical direction of the lower-half inside member relative to the lower-half outside member, includes: inserting the eccentric shaft part of the eccentric pin into the eccentric shaft hole of the lower-half inside member; rotatably supporting the rotating shaft part of the eccentric pin at an end in a circumferential direction of the lower-half outside member; inserting the push rod into the lower-half inside member from an end surface in a circumferential direction of the lower-half inside member; and pressing the rod contact surface of the eccentric shaft part with a tip of the push rod to rotate the eccentric pin about the rotational axis line as the center.

Here, in this position adjustment method, the lower-half inside member may be temporarily supported before supporting the rotating shaft part of the eccentric pin; the eccentric pin may be rotated with the push rod with the lower-half inside member temporarily supported; after rotating the eccentric pin, the temporary support of the lower-half inside member may be removed, and the rotating shaft part of the eccentric pin may be supported at an end in the circumferential direction of the lower-half outside member.

With this method, the eccentric pin is rotated with the lower-half inside member in the temporarily supported condition, so the load of the lower-half inside member is not applied to the eccentric pin, and the eccentric pin can be easily rotated.

Advantageous Effects of Invention

According to the position adjustment device, the rotating machine provided with the same, and the position adjustment method as described above, it is possible to adjust the position in the vertical direction of the lower-half inside member that forms the lower half of the inside ring, relative to the lower-half outside member that forms the lower-half of the outside cylinder, without increasing the size of the outside cylinder.

DESCRIPTION OF EMBODIMENTS

The following describes in detail an embodiment of a position adjustment device and a rotating machine provided with the same according to the present invention, with reference to the drawings.

Figure 1:
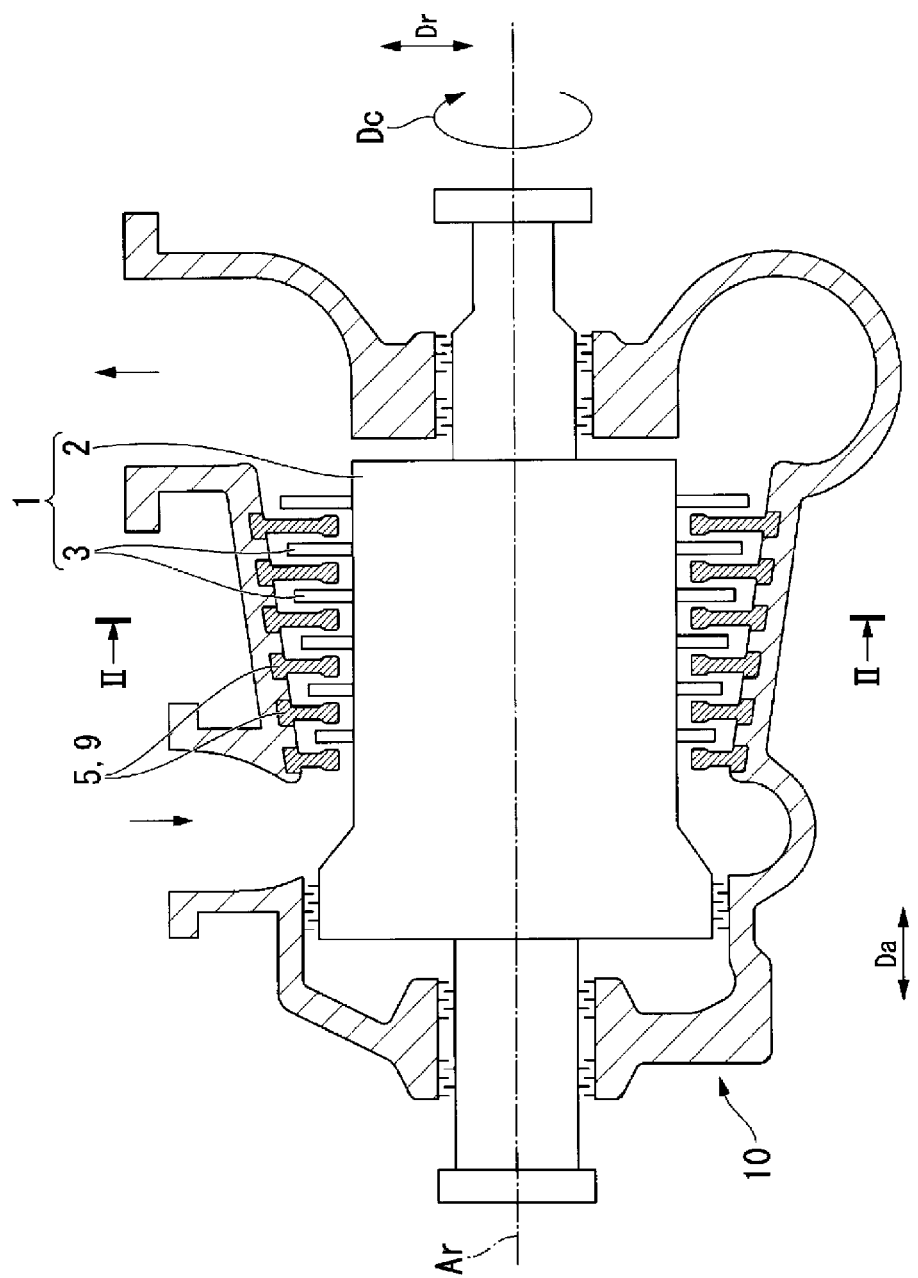
FIG. 1 is a cross-sectional view illustrating a steam turbine of an embodiment according to the present invention.
Figure 2:
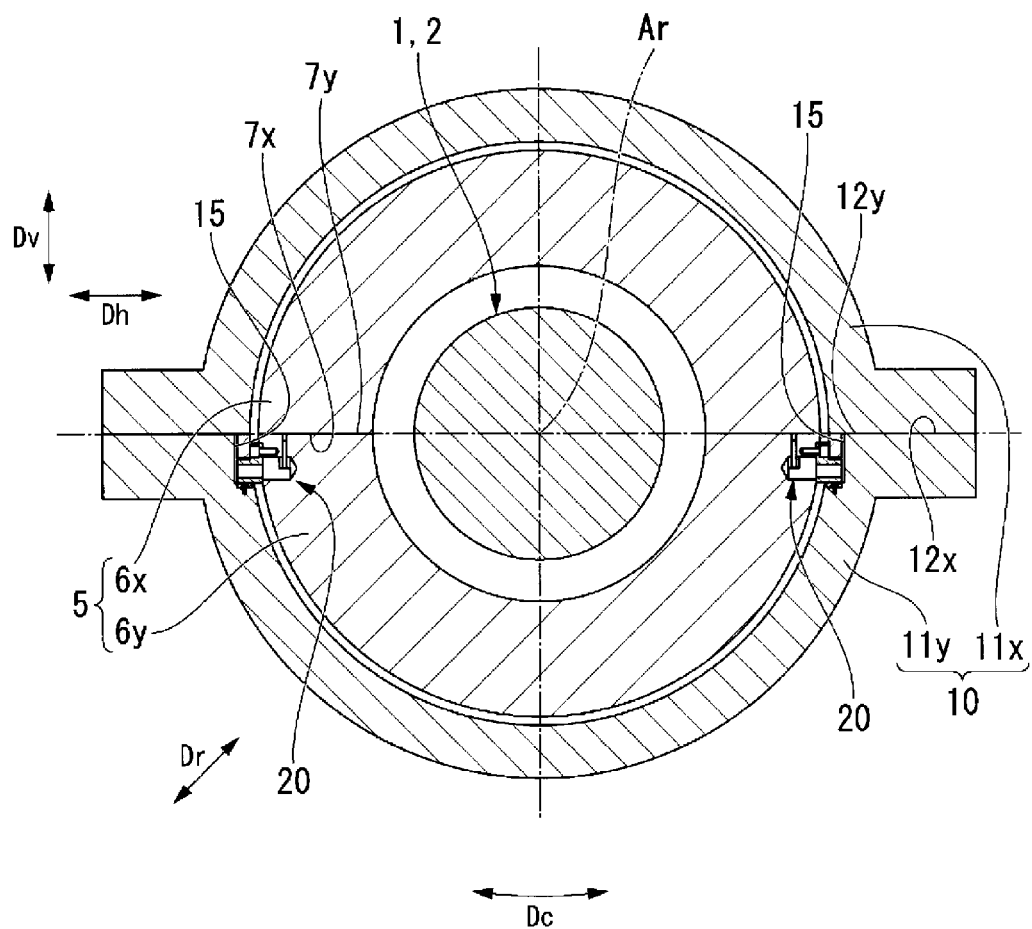
FIG. 2 is a cross-sectional view taken along the line II-II of FIG. 1.

The rotating machine according to the present embodiment is a steam turbine. As illustrated in FIGS. 1 and 2, the steam turbine includes a rotor 1 that rotates about a rotor axis line Ar extending in the horizontal direction as the center, a ring-shaped vane ring (inside ring) 5 disposed on the outer peripheral side of the rotor 1 and having the rotor axis line Ar as the center, a cylindrical casing (outside cylinder) 10 disposed on the outer peripheral side of the vane ring 5 and having the rotor axis line Ar as the center, and a position adjustment device 20 (see FIG. 2) that adjusts the position of the vane ring 5 relative to the casing 10.

Hereinafter, the direction in which the rotor axis line Ar extends is referred to as the rotor axis direction Da, and the radial direction with respect to the rotor axis line Ar is referred to simply as the radial direction Dr. Of the directions perpendicular to the rotor axis line Ar, the vertical direction is referred to as the vertical direction Dv, and the horizontal direction is referred to as the horizontal direction Dh. Also, the direction around the rotor axis line Ar is referred to as the circumferential direction Dc.

The rotor 1 includes a rotor shaft 2 that extends in the rotor axis direction Da with the rotor axis line Ar as the center, and a plurality of blades 3 aligned on the rotor shaft 2 in the circumferential direction Dc and fixed to the rotor shaft 2.

Figure 3:
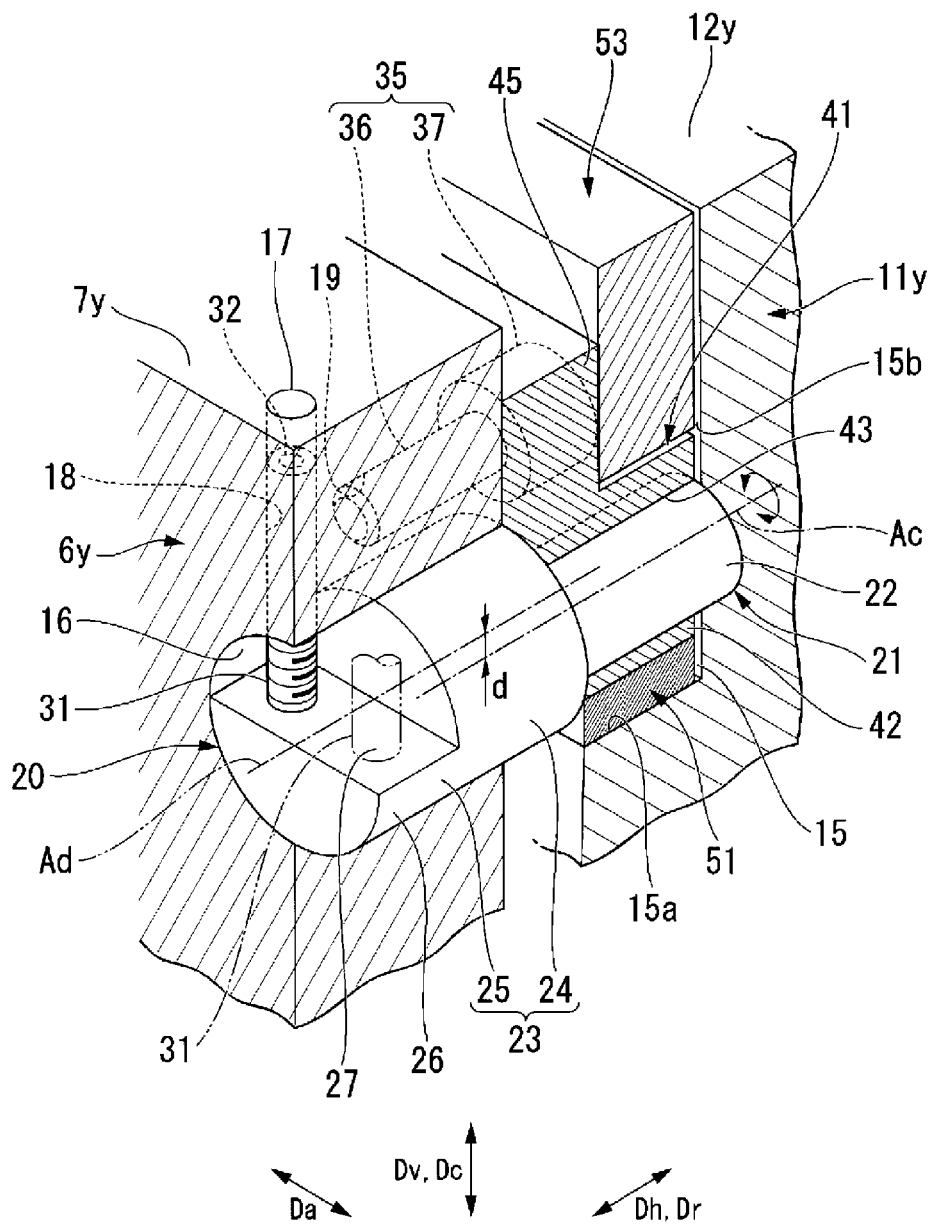
FIG. 3 is an exploded perspective view illustrating the main portion of a position adjustment device according to the embodiment of the present invention.
Figure 4:
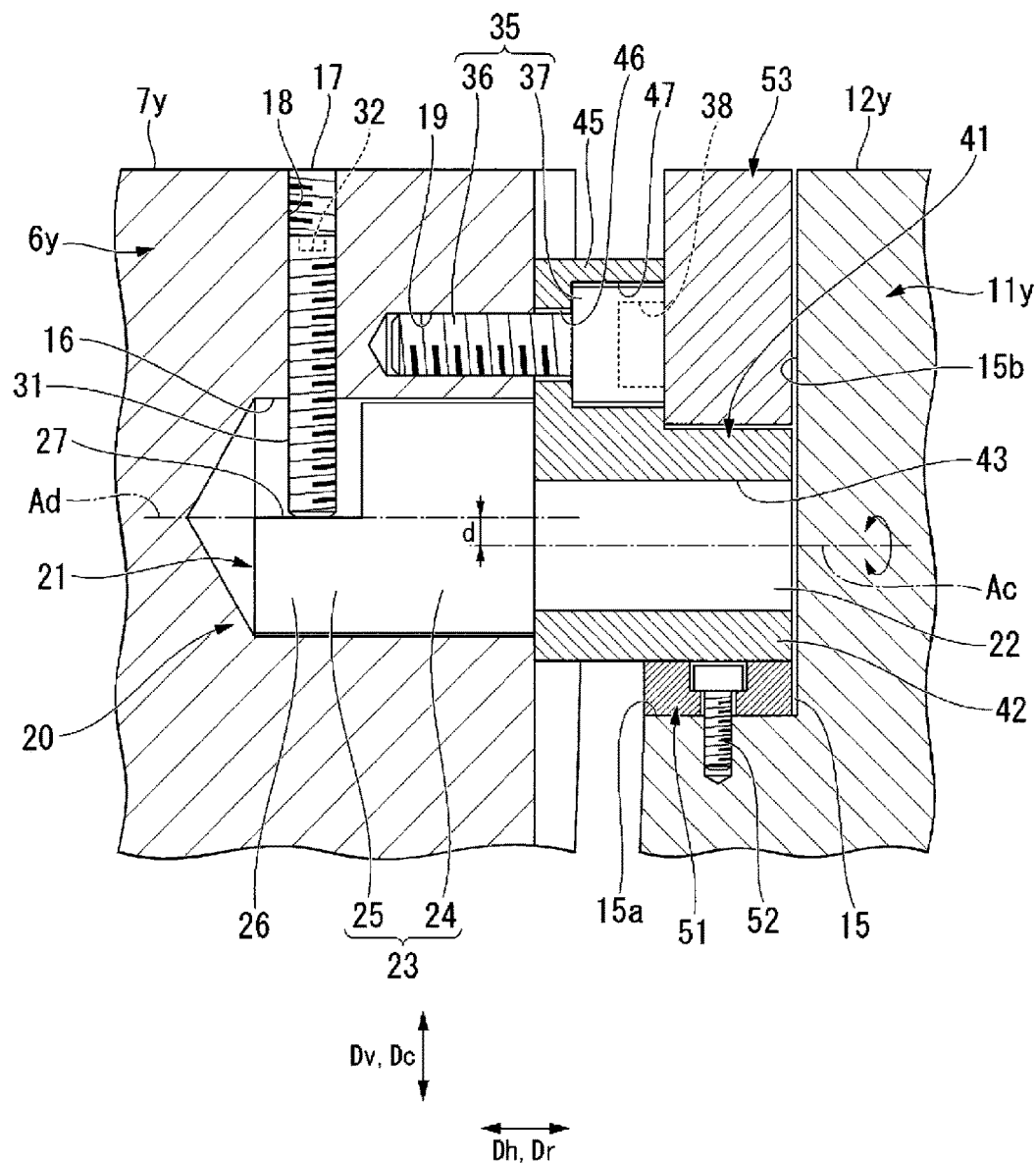
FIG. 4 is a cross-sectional view of the position adjustment device according to the embodiment of the present invention.

A plurality of vanes 9 aligned in the circumferential direction Dc is provided on the inner peripheral side of the ring-shaped vane ring 5 at positions on the upstream side of the blades 3 of the rotor 1. In the steam turbine, the cylindrical space between the outer peripheral side of the rotor shaft 2 and the ring-shaped vane ring 5, in other words the space in which the blades 3 and the vanes 9 are disposed, forms the steam flow path. The ring-shaped vane ring 5 includes an upper-half vane ring 6x on the upper side relative to the rotor shaft 2, and a lower-half vane ring (lower-half inside member) 6y on the lower side thereof. The upper-half vane ring 6x and the lower-half vane ring 6y extend in the circumferential direction Dc, and at their respective ends in the circumferential direction Dc they are connected by bolts or the like. In this case a dividing surface 7x, which is the end surface of the upper-half vane ring 6x in the circumferential direction Dc, and a dividing surface 7y, which is the end surface of the lower-half vane ring 6y in the circumferential direction Dc, are in mutual contact. Also, the ring-shaped casing 10 includes an upper-half casing 11x on the upper side relative to the rotor shaft 2, and a lower-half casing (lower-half outside member) 11y on the lower side thereof. The upper-half casing 11x and the lower-half casing 11y extend in the circumferential direction Dc, and at their respective ends in the circumferential direction Dc they are mutually connected by bolts or the like. In this case a dividing surface 12x, which is the end surface of the upper-half casing 11x in the circumferential direction Dc, and a dividing surface 12y, which is the end surface of the lower-half casing 11y in the circumferential direction Dc, are in mutual contact. A groove 15 that is depressed from the inner peripheral side towards the outer peripheral side is formed at both ends of the lower-half casing 11y in the circumferential direction Dc. As illustrated in FIGS. 3 and 4, the groove 15 is demarcated by a groove bottom surface 15a that faces to the upper side, and a groove side surface 15b that faces towards the inner peripheral side.

In the present embodiment, the casing 10 forms an outside cylinder, and the lower-half casing 11y forms a lower-half outside member. Also, the vane ring 5 forms an inside ring, and the lower-half vane ring 6y forms a lower-half inside member.

As illustrated in FIG. 2, the position adjustment device 20 is provided in the groove 15 at one end of the lower-half casing 11y in the circumferential direction Dc and in the groove 15 at the other end. As illustrated in FIGS. 3 and 4, the position adjustment device 20 includes an eccentric pin 21, two push bolts (push rods) 31 whose tips come into contact with the eccentric pin 21, a support block 41 that rotatably supports the eccentric pin 21 within the groove 15 of the lower-half casing 11y, a block fixing bolt (fixing fitting) 35 that fixes the support block 41 to the lower-half vane ring 6y, a lower liner 51 disposed between the support block 41 and the groove bottom surface 15a of the groove 15, a liner fixing bolt 52 that fixes the lower liner 51 within the groove 15 of the lower-half casing 11y, and an upper liner 53 disposed above the support block 41.

The eccentric pin 21 includes a rotating shaft part 22 formed in a columnar shape with a rotational axis line Ac extending in the horizontal direction and in a direction perpendicular to the rotor axis line Ar as the center, and an eccentric shaft part 23 having a side peripheral surface 26 with an eccentric axis line Ad parallel to the rotational axis line Ac with an offset therebetween as the center and a bolt contact surface (rod contact surface) 27 that comes into contact with the push bolt 31. The rotating shaft part 22 and the eccentric shaft part 23 are formed integrally. The eccentric shaft part 23 includes a columnar part 24 with the eccentric axis line Ad as the center, and a notched columnar part 25 formed in a columnar shape with the eccentric axis line Ad as the center, having the same diameter as the columnar part 24, and having a notch formed in a part of the column. The notched columnar part 25 is formed in a half-columnar shape. A plane of the half column that includes the eccentric axis line Ad forms the bolt contact surface 27. Also, the side peripheral surface 26 of the eccentric shaft part 23 is the side peripheral surface of the columnar part 24 and the side peripheral surface of the notched columnar part 25.

A hexagonal wrench hole 32 or the like (see FIG. 4) into which, for example, the tip of a hexagonal wrench is inserted is formed at one end in the longitudinal direction of the push bolt 31. There are two push bolts 31 for one eccentric pin 21.

The block fixing bolt 35 includes a screw part 36 and a bolt head 37. A male thread is formed on the screw part 36. A hexagonal wrench hole 38 or the like (see FIG. 4) into which, for example, the tip of a hexagonal wrench is inserted is formed in the bolt head 37.

The support block 41 includes a pin support part 42 in which a columnar rotating shaft hole 43 into which the rotating shaft part 22 of the eccentric pin 21 is rotatably inserted is formed, and a fixing part 45 in which a bolt insertion hole 46 into which the screw part 36 of the block fixing bolt 35 is inserted and a head housing hole 47 into which the bolt head 37 is inserted are formed. The fixing part 45 is positioned above the pin support part 42, and is formed integrally with the pin support part 42. The rotating shaft hole 43 penetrates the pin support part 42 in the horizontal direction Dh. Also, the head housing hole 47 is recessed in the horizontal direction Dh from the outer surface of the fixing part 45. The bolt insertion hole 46 penetrates the fixing part 45 in the horizontal direction Dh from the bottom surface of the head housing hole 47 of the fixing part 45. The inner diameter of the head housing hole 47 is larger than the outer diameter of the bolt head 37 of the block fixing bolt 35. Also, the inner diameter of the bolt insertion hole 46 is larger than the outer diameter of the screw part 36 of the block fixing bolt 35. Therefore, in the state in which the screw part 36 of the block fixing bolt 35 is completely inserted into the bolt insertion hole 46 of the support block 41, the block fixing bolt 35 is capable of a certain amount of movement in a direction perpendicular to the axis of the block fixing bolt 35 relative to the support block 41.

The width in the horizontal direction Dh of the fixing part 45 of the support block 41 is smaller than the width in the horizontal direction Dh of the pin support part 42 of the support block 41. Also, the width in the horizontal direction Dh of the fixing part 45 is slightly smaller than the width in the horizontal direction Dh of the groove 15 of the lower-half casing 11y, and substantially the same as the width in the horizontal direction Dh of the groove 15. The surface of the fixing part 45 in the horizontal direction Dh on the lower-half vane ring 6y side is coplanar with the surface of the pin support part 42 in the horizontal direction Dh on the lower-half vane ring 6y side. Therefore, when the support block 41 is accommodated within the groove 15 of the lower-half casing 11y, a gap is produced between the fixing part 45 on the lower-half casing 11y side in the horizontal direction Dh and the groove side surface 15b of the groove 15. The upper liner 53 is disposed in this gap. In this case the top surface of the upper liner 53 is substantially coplanar with the dividing surface 12y of the lower-half casing 11y. On the other hand, the width in the horizontal direction Dh of the lower liner 51 is the same as the width in the horizontal direction Dh of the groove 15 of the lower-half casing 11y. As stated previously, the lower liner 51 is disposed between the pin support part 42 of the support block 41 and the groove bottom surface 15a of the groove 15.

A columnar eccentric shaft hole 16 into which the eccentric shaft part 23 of the eccentric pin 21 is rotatably inserted, a push bolt hole (rod hole) 17 into which the push bolt 31 can be inserted, and a fixing bolt hole 19 into which the screw part 36 of the block fixing bolt 35 can be screwed are formed in the ends of the lower-half vane ring 6y in the circumferential direction Dc. The eccentric shaft hole 16 is recessed from the outer periphery of the lower-half vane ring 6y towards the rotor shaft 2 side in the horizontal direction Dh. The push bolt hole 17 is recessed vertically downwards from the dividing surface 7y of the lower-half vane ring 6y, and penetrates to the eccentric shaft hole 16. A female thread 18 that can mate with the push bolt 31 is formed on the inner peripheral surface of the push bolt hole 17. Two push bolt holes 17 are formed for one eccentric shaft hole 16, the same number as the number of the push bolts 31. Of the two push bolt holes 17, one push bolt hole 17 is formed on one side of the eccentric axis line Ad in the rotor axis direction Da, and the other push bolt hole 17 is formed on the other side of the eccentric axis line Ad in the rotor axis direction Da. The fixing bolt hole 19 is recessed from the outer periphery of the lower-half vane ring 6y towards the rotor shaft 2 side in the horizontal direction Dh. Therefore, the direction in which the fixing bolt hole 19 is recessed and the direction in which the eccentric shaft hole 16 is recessed are the same. A female thread that can mate with the screw part 36 of the block fixing bolt 35 is formed on the inner peripheral surface of the fixing bolt hole 19.

Next, a method of assembling the steam turbine, and a method of adjusting the position of the lower-half vane ring 6y relative to the lower-half casing 11y using the position adjustment device are described.

Figure 5:
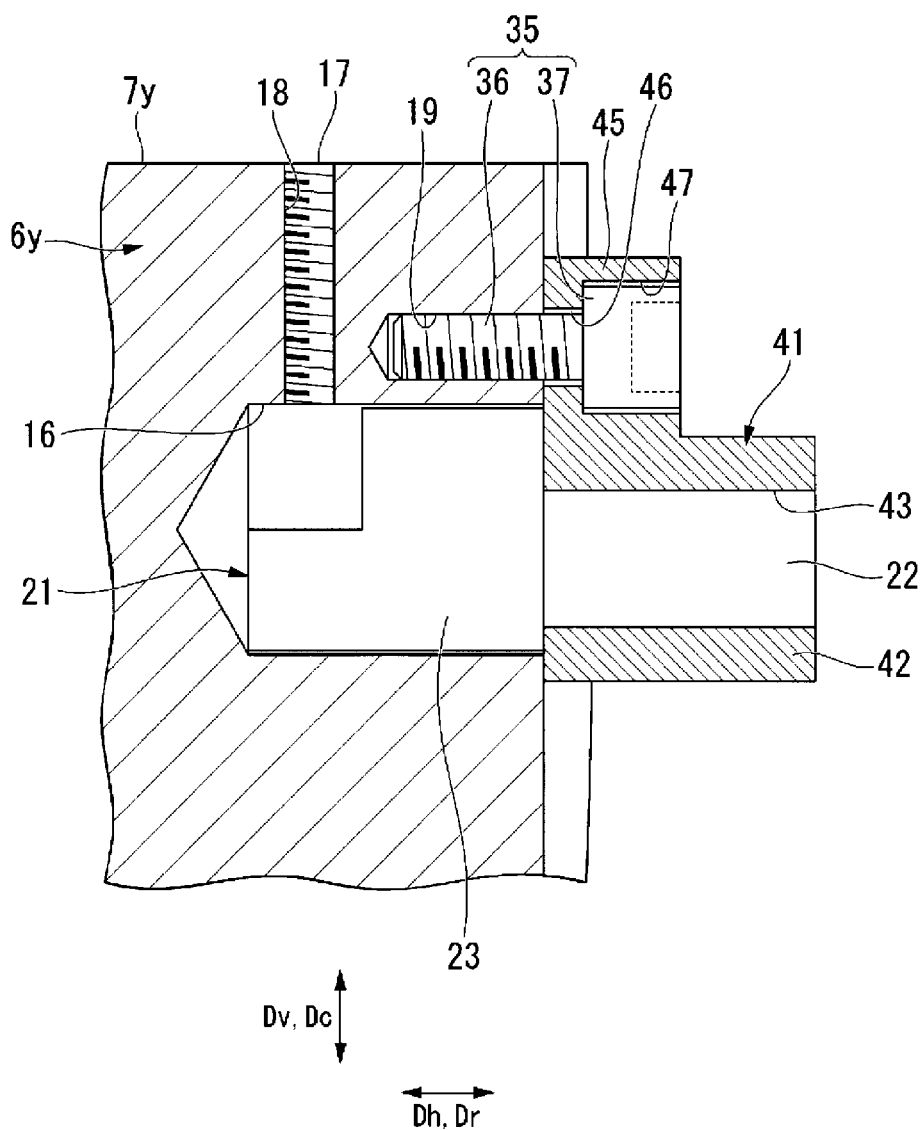
FIG. 5 is a cross-sectional view around the position adjustment device in a steam turbine assembly process (part 1) according to the embodiment of the present invention.

First, as illustrated in FIG. 5, the eccentric pin 21 is installed on the lower-half vane ring 6y, and the support block 41 is temporarily fixed to the lower-half vane ring 6y. At this time, the eccentric shaft part 23 of the eccentric pin 21 is inserted into the eccentric shaft hole 16 of the lower-half vane ring 6y. Next, the rotating shaft part 22 of the eccentric pin 21 is inserted into the rotating shaft hole 43 of the support block 41. Then, the screw part 36 of the block fixing bolt 35 is inserted into the bolt insertion hole 46 of the support block 41, and the screw part 36 is lightly screwed into the fixing bolt hole 19 of the lower-half vane ring 6y. At this stage, the screw part 36 of the block fixing bolt 35 is not securely screwed into the fixing bolt hole 19 of the lower-half vane ring 6y, so that the support block 41 is in such a state that it can move a certain amount relatively in a direction perpendicular to the direction in which the block fixing bolt 35 extends. Note that here the eccentric shaft part 23 of the eccentric pin 21 is inserted into the eccentric shaft hole 16 of the lower-half vane ring 6y, and then the rotating shaft part 22 of the eccentric pin 21 is inserted into the rotating shaft hole 43 of the support block 41. However, conversely the rotating shaft part 22 of the eccentric pin 21 may be inserted into the rotating shaft hole 43 of the support block 41, and then the eccentric shaft part 23 of the eccentric pin 21 may be inserted into the eccentric shaft hole 16 of the lower-half vane ring 6y.

Figure 6:
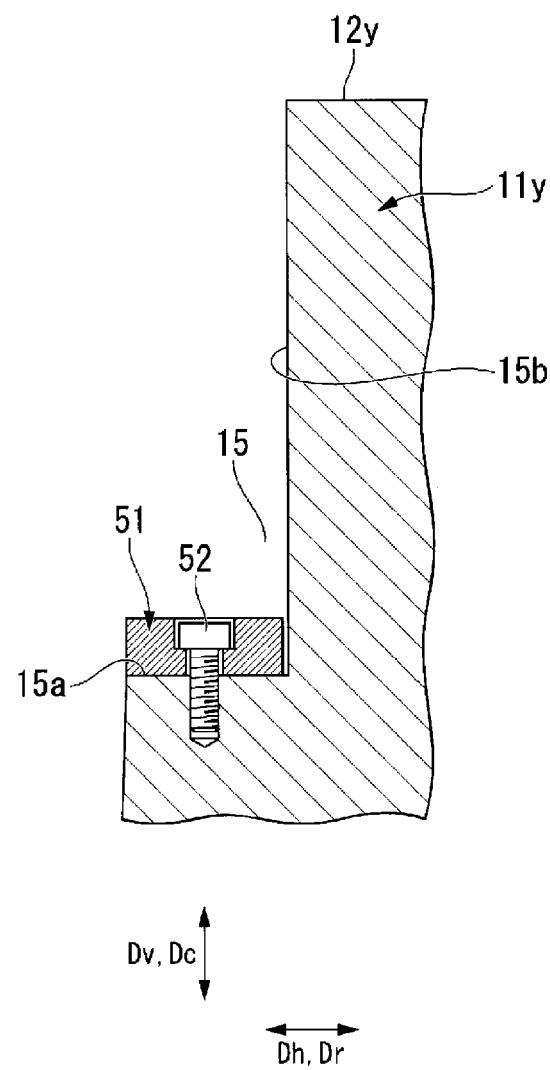
FIG. 6 is a cross-sectional view around the position adjustment device in a steam turbine assembly process (part 2) according to the embodiment of the present invention.

Next, as illustrated in FIG. 6, the lower liner 51 is fixed to the groove bottom surface 15a of the groove 15 of the lower-half casing 11y using the liner fixing bolt 52.

Figure 7:
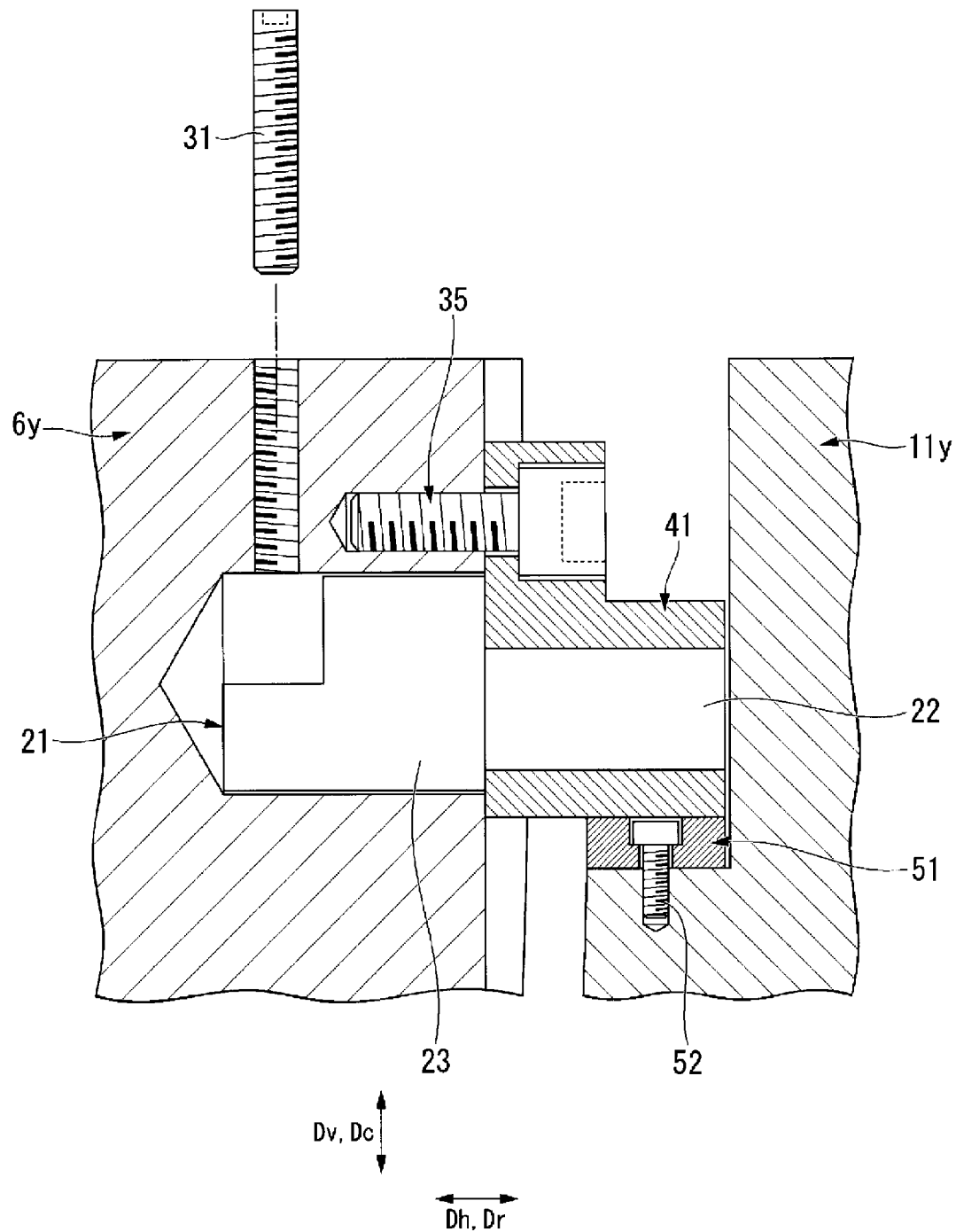
FIG. 7 is a cross-sectional view around the position adjustment device in a steam turbine assembly process (part 3) according to the embodiment of the present invention.

Next, as illustrated in FIG. 7, the lower-half vane ring 6y to which the eccentric pin 21 and the support block 41 have been installed is assembled onto the lower-half casing 11y on which the lower liner 51 has been installed.

In the state in which the lower-half vane ring 6y has been assembled onto the lower-half casing 11y, the lower-half vane ring 6y is supported by the lower-half casing 11y via the eccentric pin 21, the support block 41, and the lower liner 51.

Figure 8:
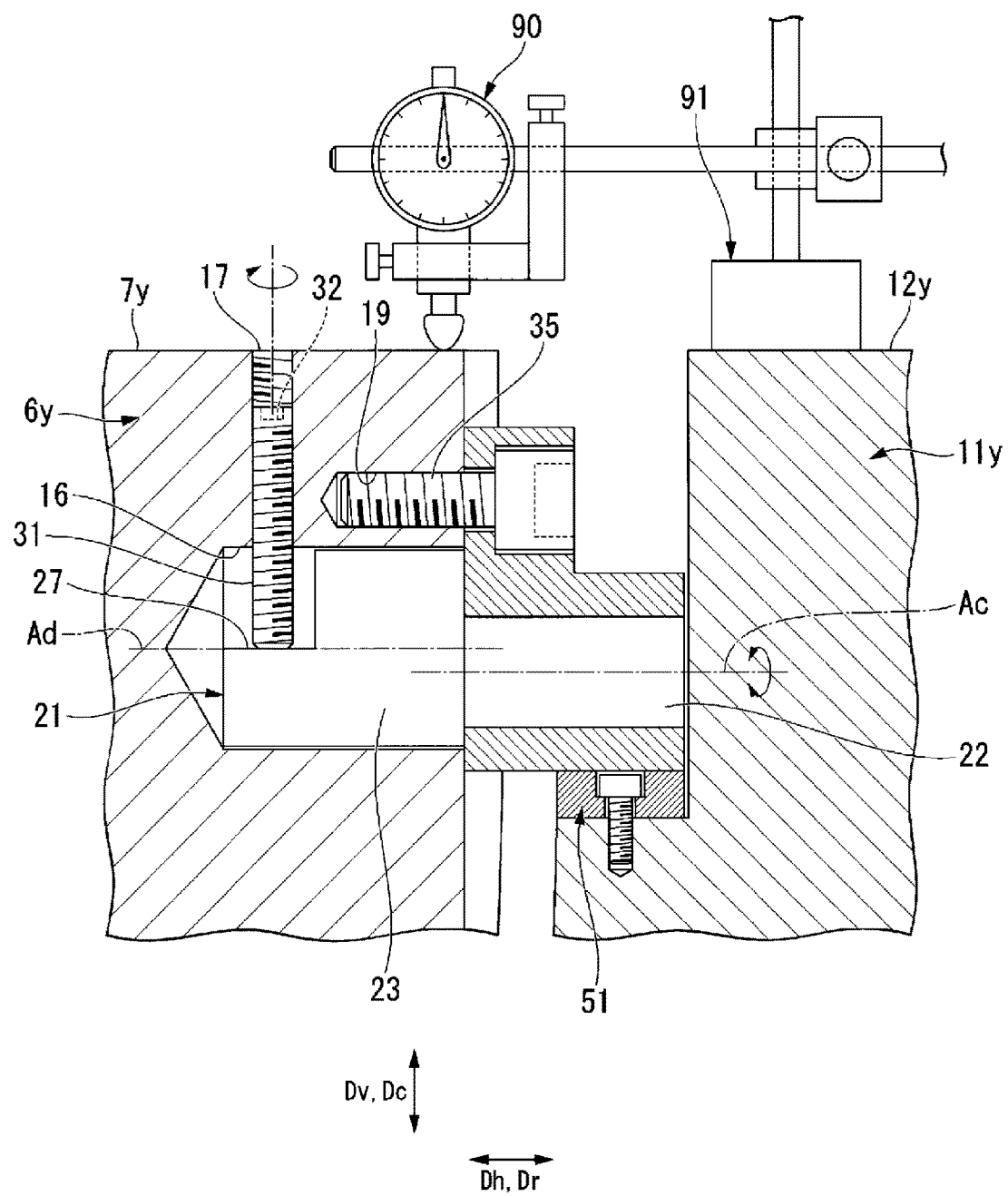
FIG. 8 is a cross-sectional view around the position adjustment device in a position adjustment process according to the embodiment of the present invention.

Next, as illustrated in FIG. 8, after setting a dial gauge 90, the push bolt 31 is screwed into the push bolt hole 17 of the lower-half vane ring 6y. In setting the dial gauge 90, the dial gauge 90 is installed on a gauge stand 91, and the gauge stand 91 is placed on the dividing surface 12y of the lower-half casing 11y. In addition, the measurement probe of the dial gauge 90 is brought into contact with the dividing surface 7y of the lower-half vane ring 6y, so that it is possible to measure the amount of positional deviation of the lower-half vane ring 6y in the vertical direction Dv relative to the lower-half casing 11y using the dial gauge 90. In screwing the push bolt 31 into the push bolt hole 17, the end of a hexagonal wrench is inserted into the hexagonal wrench hole 32 of the push bolt 31, and the push bolt 31 is rotated.

Figure 9:
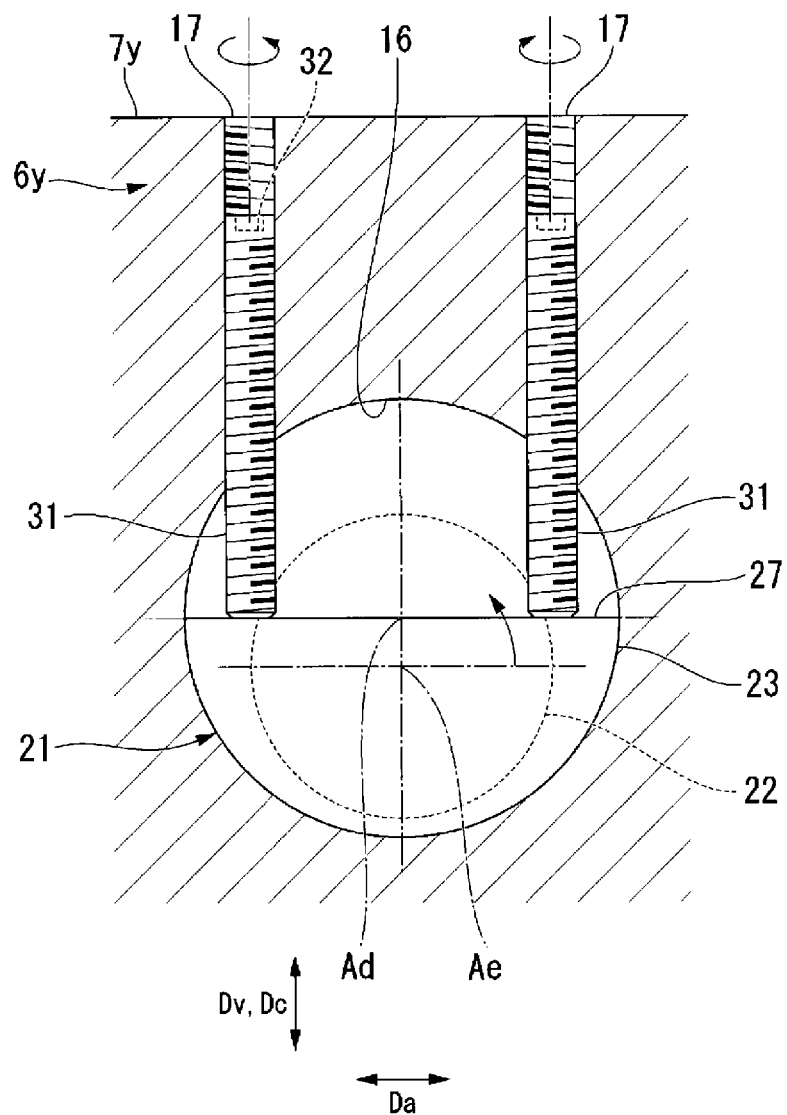
FIG. 9 is an explanatory view (part 1) illustrating the operation of moving a lower-half vane ring in the vertical direction relative to a lower-half casing in the embodiment of the present invention.
Figure 10:
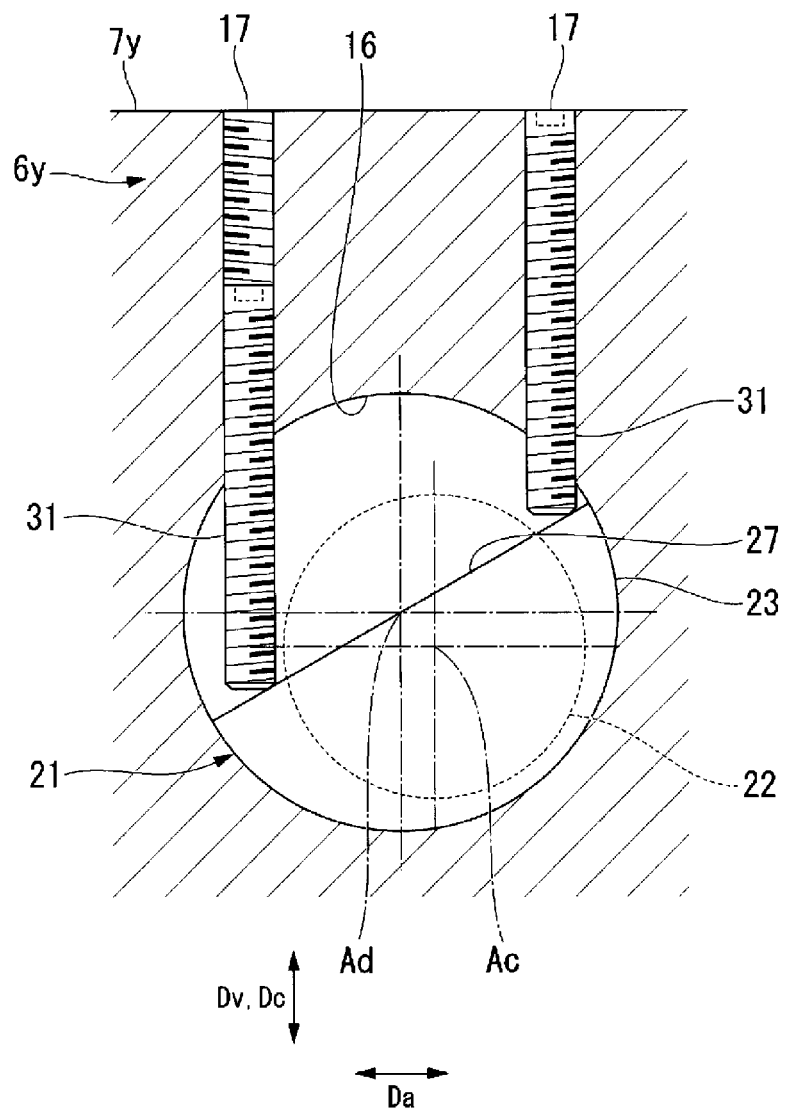
FIG. 10 is an explanatory view (part 2) illustrating the operation of moving the lower-half vane ring in the vertical direction relative to the lower-half casing in the embodiment of the present invention.

Next, the amounts that the two push bolts 31 are screwed into their respective push bolt holes 17 are adjusted as appropriate while checking the amount of deviation, which is indicated by the dial gauge 90, of the dividing surface 7y of the lower-half vane ring 6y relative to the dividing surface 12y of the lower-half casing 11y. When the two push bolts 31 are screwed into their respective push bolt holes 17, the tips of the push bolts 31 contact the bolt contact surface 27 of the eccentric pin 21, as illustrated in FIGS. 9 and 10. In addition, when the amounts that the two push bolts 31 are screwed into their respective push bolt holes 17 are adjusted, the bolt contact surface 27 of the eccentric pin 21 is pressed by the push bolts 31, and the eccentric shaft part 23 of the eccentric pin 21 rotates about the eccentric axis line Ad as the center. Also, the rotating shaft part 22 of the eccentric pin 21 is formed integrally with the eccentric shaft part 23, so it rotates about the eccentric axis line Ad as the center. In the process of rotating about the eccentric axis line Ad as the center, the rotating shaft part 22 rotates within the rotating shaft hole 43 of the support block 41. The rotating shaft part 22 and the support block 41 are supported by the lower-half casing 11y, so they do not move relative to the lower-half casing 11y. Therefore, taking the rotating shaft part 22 that does not move relative to the lower-half casing 11y as reference, the eccentric shaft part 23 revolves about the rotational axis line Ac of the rotating shaft part 22 as the center, in accordance with the rotation of the rotating shaft part 22. Therefore, the lower-half vane ring 6y into which the eccentric shaft part 23 is inserted moves in the direction perpendicular to the rotational axis line Ac in accordance with the revolution of the eccentric shaft part 23. On the other hand, the rotating shaft part 22 of the eccentric pin 21 and the support block 41 do not move relative to the lower-half casing 11y, as stated previously. Note that, as illustrated in FIG. 8, although the support block 41 is installed on the lower-half vane ring 6y using the block fixing bolt 35, as stated previously, the support block 41 is temporarily fixed so as to be capable of a certain amount of movement relative to the lower-half vane ring 6y, so the support block 41 moves relative to the lower-half vane ring 6y, but does not move relative to the lower-half casing 11y.

When, as a result of adjusting the amount that the two push bolts 31 are screwed into their respective push bolt holes 17, the amount of deviation indicated by the dial gauge 90, in other words the amount of positional deviation of the lower-half vane ring 6y in the vertical direction Dv relative to the lower-half casing 11y, is within a target amount of deviation, the two push bolts 31 are each screwed in a certain amount so that the tips of the two push bolts 31 are securely in contact with the bolt contact surface 27 of the eccentric pin 21. As a result, the eccentric pin 21 cannot rotate about the rotational axis line Ac. Then, the block fixing bolt 35 is securely screwed into the lower-half vane ring 6y, and the support block 41 is securely fixed to the lower-half vane ring 6y.

Next, as illustrated in FIG. 4, the upper liner 53 is disposed in the gap between the lower-half casing 11y side of the fixing part 45 in the horizontal direction Dh and the groove side surface 15b of the groove 15 of the lower-half casing 11y.

This completes the adjustment of the position of the lower-half vane ring 6y in the vertical direction Dv relative to the lower-half casing 11y.

Note that the operation of adjusting the position of the lower-half vane ring 6y relative to the lower-half casing 11y by manipulating the two position adjustment devices 20 may be performed by carrying out the adjustment operation by manipulating one of the position adjustment devices 20 and carrying out the adjustment operation by manipulating the other of the position adjustment devices 20 at the same time, or after completing the adjustment operation by manipulating one of the position adjustment devices 20, the adjustment operation by manipulating the other of the position adjustment devices 20 may be carried out.

Figure 11:
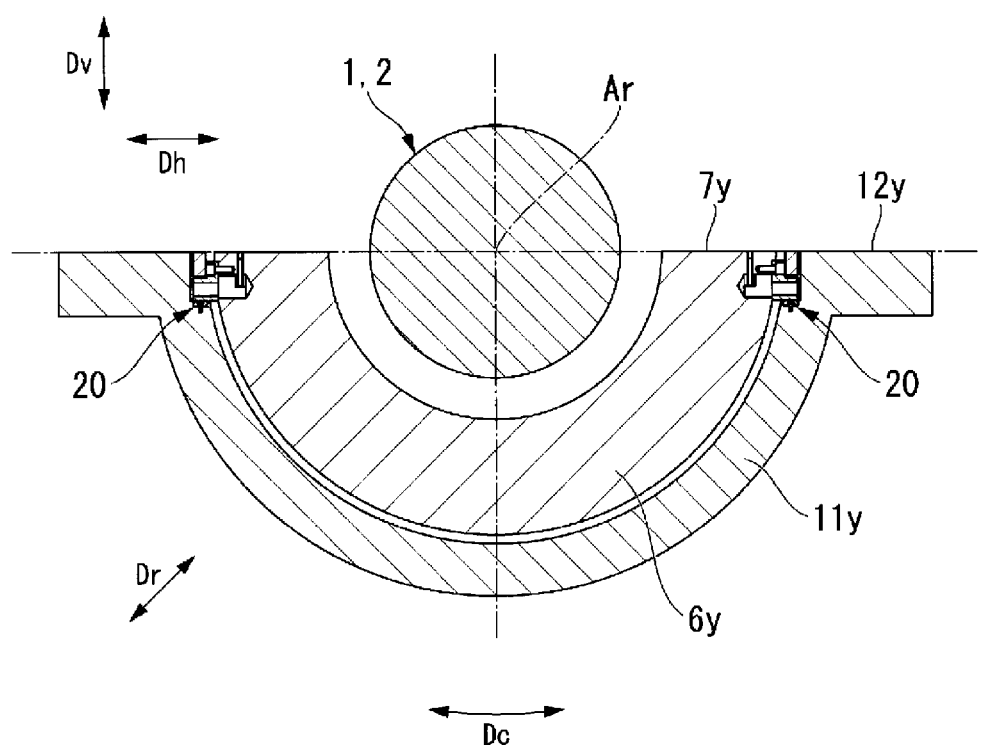
FIG. 11 is a cross-sectional view of the steam turbine in a steam turbine assembly process (part 4) according to the embodiment of the present invention.

Next, as illustrated in FIG. 11, the rotor 1 is assembled onto the lower-half casing 11y onto which the lower-half vane ring 6y has been assembled. The rotor 1 is rotatably supported on the lower-half casing 11y via bearings (not illustrated on the drawings) provided on the lower-half casing 11y.

Next, as illustrated in FIG. 2, the upper-half vane ring 6x is placed on the lower-half vane ring 6y so that the dividing surface 7x of the upper-half vane ring 6x comes into contact with the dividing surface 7y of the lower-half vane ring 6y, and the ends of the upper-half vane ring 6x in the circumferential direction Dc are connected to the ends of the lower-half vane ring 6y in the circumferential direction Dc with bolts or the like.

Next, the upper-half casing 11x is placed on the lower-half casing 11y so that the dividing surface 12x of the upper-half casing 11x comes into contact with the dividing surface 12y of the lower-half casing 11y, and the ends of the upper-half casing 11x in the circumferential direction Dc are connected to the ends of the lower-half casing 11y in the circumferential direction Dc with bolts or the like.

This completes the assembly of the steam turbine.

In the above, after completing the adjustment of the position of the lower-half vane ring 6y in the vertical direction Dv relative to the lower-half casing 11y, the rotor 1 is assembled onto the lower-half casing 11y onto which the lower-half vane ring 6y has been assembled. However, after assembling onto the lower-half casing 11y the lower-half vane ring 6y onto which the eccentric pin 21 and the support block 41 have been installed, the rotor may be assembled onto the lower-half casing 11y before completing the adjustment of the position of the lower-half vane ring 6y in the vertical direction Dv relative to the lower-half casing 11y.

As described above, in the present embodiment, the push bolts 31 that enter into the lower-half vane ring 6y from the dividing surface 7y of the lower-half vane ring 6y press on the bolt contact surface 27 of the eccentric pin 21, and rotate the eccentric pin 21 about the rotational axis line Ac. Therefore, in the present embodiment, it is not necessary to engage the tip of a tool with the eccentric pin 21 from the outside in the radial direction of the eccentric pin 21 and manipulate this tool in order to rotate the eccentric pin 21 about the rotational axis line Ac. Therefore, in the present embodiment, it is not necessary to increase the dimension of the groove 15 or increase the outer diameter of the casing 10 in order to provide tool space on the outside in the radial direction of the eccentric pin 21. In other words, in the present embodiment, the position of the lower-half vane ring 6y in the vertical direction Dv relative to the lower-half casing 11y can be adjusted without increasing the size of the casing 10.

Also, in the present embodiment, the position of the lower-half vane ring 6y in the vertical direction Dv relative to the lower-half casing 11y can be adjusted by adjusting the amount that the push bolts 31 are screwed in. Therefore, in the present embodiment, the position of the lower-half vane ring 6y in the vertical direction Dv relative to the lower-half casing 11y can be more simply, accurately, and finely adjusted than by adjusting the amount that simple rods without male threads formed on the outer periphery thereof are pressed in.

In addition, in the present embodiment, the position of the lower-half vane ring 6y in the vertical direction Dv relative to the lower-half casing 11y is adjusted while screwing the two push bolts 31 into the lower-half vane ring 6y, so when the adjustment is complete, the eccentric pin 21 cannot rotate due to the two push bolts 31. Therefore, in the present embodiment, it is not necessary to carry out a separate operation to stop the rotation of the eccentric pin 21, so the working time can be shortened.

First Modification of the Eccentric Pin

Figure 12:
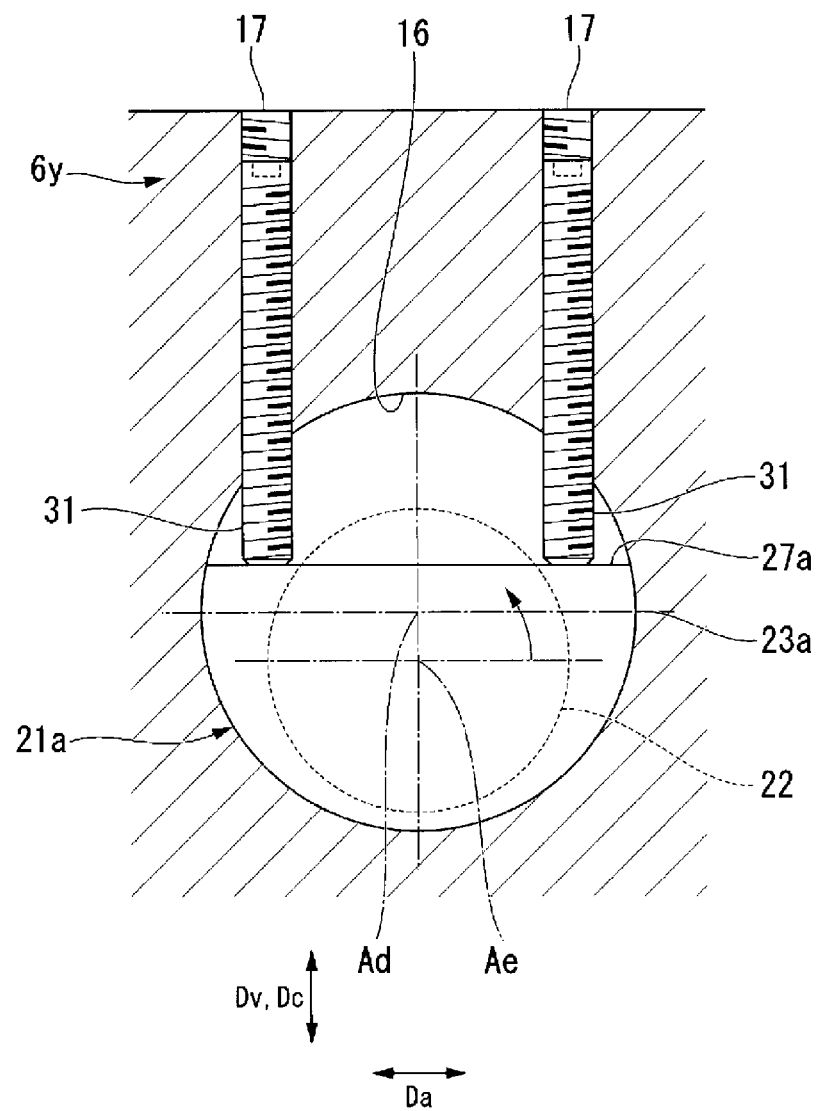
FIG. 12 is a front view illustrating an eccentric pin in a first modification according to the present invention.

Next, a first modification of the eccentric pin will be described with reference to FIG. 12.

An eccentric pin 21a of the present modification also includes, as with the eccentric pin 21 of the embodiment described above, the rotating shaft part 22 formed in a columnar shape with the rotational axis line Ac as the center, and an eccentric shaft part 23a having the side peripheral surface 26 with the eccentric axis line Ad as the center and a bolt contact surface 27a that comes into contact with the push bolt 31. In the embodiment as described above, a plane that includes the eccentric axis line Ad forms the bolt contact surface 27, but in the present modification a plane that does not include the eccentric axis line Ad but is parallel to the eccentric axis line Ad forms the bolt contact surface 27a.

In this way, the bolt contact surface 27a may be a plane that does not include the eccentric axis line Ad.

Second Modification of the Eccentric Pin

Figure 13:
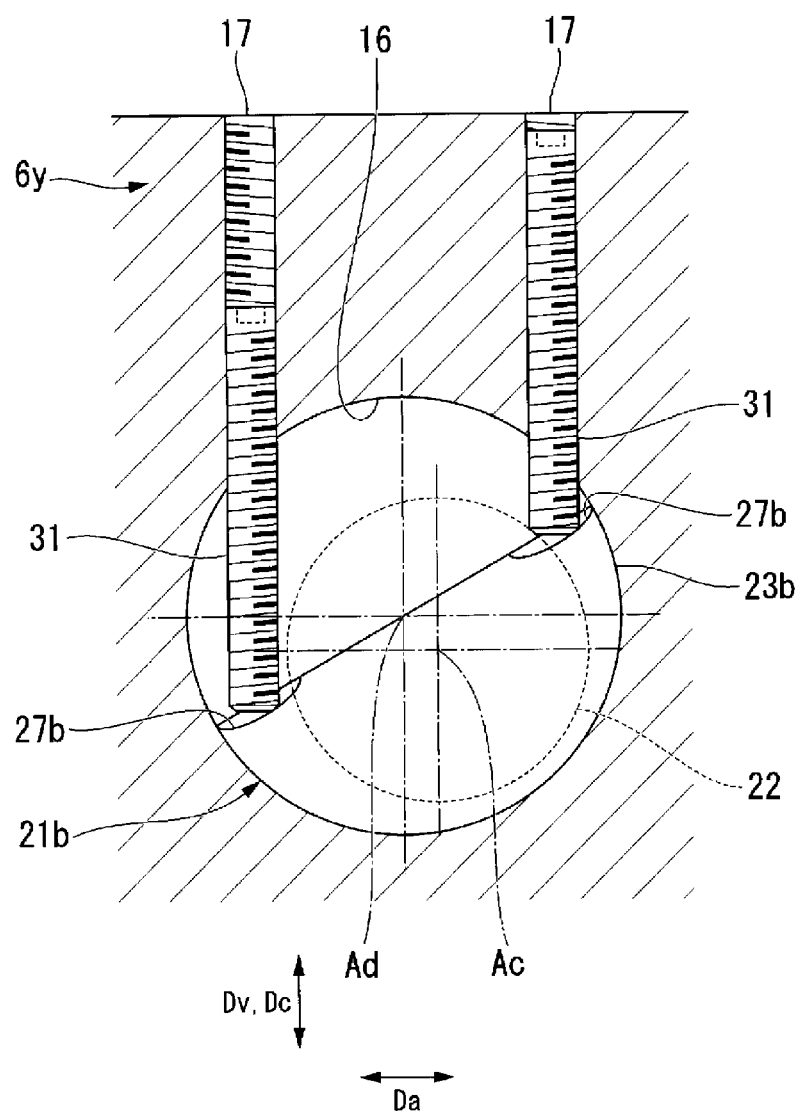
FIG. 13 is a front view illustrating an eccentric pin in a second modification according to the present invention.

A second modification of the eccentric pin will be described with reference to FIG. 13.

An eccentric pin 21b of the present modification also includes, as with the eccentric pin 21 of the embodiment described above, the rotating shaft part 22 formed in a columnar shape with the rotational axis line Ac as the center, and an eccentric shaft part 23b having the side peripheral surface 26 with the eccentric axis line Ad as the center and a bolt contact surface 27b that comes into contact with the push bolt 31. In the previously described embodiment and the first modification, the bolt contact surfaces 27, 27a were planes, but in the present modification the bolt contact surface 27b is a curved surface that is gently recessed from the notched side of the eccentric pin 21b towards the side peripheral surface 26 side.

By making the bolt contact surface 27b a gently recessed curved surface in this way, even when the eccentric pin 21b is rotated about the rotational axis line Ac as the center, the contact characteristics between the tips of the push bolts 31 and the bolt contact surface 27b can be maintained.

Other Modifications

In the embodiment as described above, the female thread 18 is formed on the inner peripheral surface of the push bolt hole 17, which is the rod hole, and the male thread is formed on the push bolt 31, which is the push rod, to mate with the push bolt hole 17. However, the female thread need not be formed on the inner peripheral surface of the rod hole, and the male thread need not be formed on the push rod.

Even if such push rods are used, the rod contact surface of the eccentric pin can be pressed with the push rods, so the position of the lower-half vane ring 6y in the vertical direction Dv relative to the lower-half casing 11y can be adjusted without increasing the size of the casing 10, in the same way as the embodiment described above.

However, if such a push rod is used, it is not possible to adjust the position of the lower-half vane ring 6y in the vertical direction Dv relative to the lower-half casing 11y by adjusting the amount that the push rod is screwed in, so it is difficult to accurately and finely adjust the relative position. Also, if such a push rod is used, after the adjustment is completed, it is necessary to additionally carry out an operation to fix the push rod so that it does not move, or an operation to stop the rotation of the eccentric pin 21.

In the embodiment as described above, two push bolts 31, which are push rods, are used. However, one push rod may be used. However, in this case the rotation direction of the eccentric pin 21 is limited to one direction only.

Also, before rotating the eccentric pin 21, the lower-half vane ring 6y may be suspended slightly using a crane or the like so that the lower-half vane ring 6y does not touch the rotor 1, in other words the lower-half vane ring 6y is temporarily supported, and in that state the eccentric pin 21 may be rotated. Then, the temporary support of the lower-half vane ring 6y may be removed, so that the rotating shaft part 22 and the support block 41 are supported by the lower liner 51 of the lower-half casing 11y. According to this method, when adjusting by rotating the eccentric pin 21 the load of the lower-half vane ring 6y is not applied to the eccentric pin 21, so the eccentric pin 21 can be easily rotated, and the push bolts 31 can be easily screwed in.

The position adjustment device 20 according to the embodiment as described above determines the position of the lower-half vane ring 6y relative to the lower-half casing 11y in the steam turbine. However, the embodiments of the present invention are not limited to this, and the present invention may be applied to other rotating machines, such as gas turbines or compressors, provided that they include a rotor that rotates about the rotor axis line as the center, a cylindrical outside cylinder having the rotor axis line as the center, and a ring-shaped inside ring disposed on the inner peripheral side of the outside cylinder with the rotor axis line as the center, and that both the outside cylinder and the inside ring can be divided into an upper half and a lower half.

INDUSTRIAL APPLICABILITY

According to the position adjustment device, the rotating machine provided with the same, and the position adjustment method as described above, it is possible to adjust the position in the vertical direction of the lower-half inside member that forms the lower half of the inside ring, relative to the lower-half outside member that forms the lower half of the outside cylinder, without increasing the size of the outside cylinder.

REFERENCE SIGNS LIST

1 Rotor
2 Rotor shaft
3 Blade
5 Vane ring (inside ring)
6x Upper-half vane ring
6y Lower-half vane ring (lower-half inside member)
7x, 7y Dividing surface (end surface in the circumferential direction)
9 Vane
10 Casing (outside cylinder)
11x Upper-half casing
11y Lower-half casing (lower-half outside member)
12x, 12y Dividing surface
15 Groove
16 Eccentric shaft hole
17 Push bolt hole (rod hole)
18 Female thread
19 Fixing bolt hole
20 Position adjustment device
21, 21a, 21b Eccentric pin
22 Rotating shaft part
23, 23a, 23b Eccentric shaft part
24 Columnar part
25 Notched columnar part
26 Side peripheral surface
27, 27a, 27b Bolt contact surface (rod contact surface)
31 Push bolt (push rod)
35 Block fixing bolt (fixing fitting)
41 Support block
43 Rotating shaft hole
46 Bolt insertion hole
47 Head housing hole
51 Lower liner
53 Upper liner

The invention claimed is:

1. A position adjustment device that adjusts, relative to a lower-half outside member that forms a lower half of a cylindrical outside cylinder with a rotor axis line as the center, a position in a vertical direction of a lower-half inside member that forms a lower half of a ring-shaped inside ring disposed on an inner peripheral side of the outside cylinder and having the rotor axis line as the center, the position adjustment device comprising:
   an eccentric pin that includes
      a rotating shaft part rotatably supported at an end in a circumferential direction of the lower-half outside member, and
      an eccentric shaft part inserted into an end in a circumferential direction of the lower-half inside member, the eccentric shaft part rotating integrally with rotation of the rotating shaft part; and
   a push rod inserted into the lower-half inside member from an end surface in the circumferential direction of the lower-half inside member, the push rod being able to come into contact with the eccentric shaft part within the lower-half inside member, wherein
   the rotating shaft part has a columnar shape with a rotational axis line that extends in a horizontal direction and in a direction perpendicular to the rotor axis line as the center, and
   the eccentric shaft part is formed with a side peripheral surface that comes into contact with an inner peripheral surface of an eccentric shaft hole in the lower-half inside member into which the eccentric shaft part is inserted, and that has as the center an eccentric axis line that is parallel to the rotational axis line with an offset therebetween, and a rod contact surface that comes into contact with the push rod.

2. The position adjustment device according to claim 1, wherein
   a female thread is formed on an inner peripheral surface of a rod hole in the lower-half inside member into which the push rod is inserted, and
   a male thread capable of mating with the female thread of the rod hole is formed on an outer periphery of the push rod.

3. The position adjustment device according to claim 1, wherein the push rod includes a first push rod that comes into contact with a part of the eccentric shaft part on one side of the eccentric axis line, and a second push rod that comes into contact with a part of the eccentric shaft part on the other side of the eccentric axis line.

4. The position adjustment device according to claim 1, wherein
   the eccentric shaft part includes: a columnar part having the eccentric axis line as the center; and a notched columnar part formed in a columnar shape with the eccentric axis line as the center and having the same diameter as the columnar part, a part of the column of the notched columnar part being notched,
   the side peripheral surface of the eccentric shaft part is a side peripheral surface of the columnar part and the notched columnar part, and
   the rod contact surface of the eccentric shaft part is a surface formed by notching the column.

5. The position adjustment device according to claim 4, wherein the rod contact surface of the eccentric shaft part is a curved surface that is gently recessed towards the side peripheral surface from the notched side of the column in a direction perpendicular to the rotational axis line.

6. The position adjustment device according to claim 1, further comprising a support block which is disposed on the end of the lower-half outside member, and in which a rotating shaft hole is formed into which the rotating shaft part of the eccentric pin is inserted so that the rotating shaft part can rotate about the rotational axis line.

7. The position adjustment device according to claim 6, further comprising a fixing fitting that fixes the support block to the lower-half inside member.

8. A rotating machine, comprising:
   the position adjustment device according to claim 1;
   a casing as the outside cylinder;
   a vane ring as the inside ring; and
   a rotor disposed within the casing that rotates about the rotor axis line as the center.

9. A position adjustment method using the position adjustment device according to claim 1 for adjusting a position in a vertical direction of the lower-half inside member relative to the lower-half outside member, the method comprising:
- inserting the eccentric shaft part of the eccentric pin into the eccentric shaft hole of the lower-half inside member;
- supporting the rotating shaft part of the eccentric pin at an end in a circumferential direction of the lower-half outside member;
- inserting the push rod into the lower-half inside member from an end surface in a circumferential direction of the lower-half inside member; and
- pressing the rod contact surface of the eccentric shaft part with a tip of the push rod to rotate the eccentric pin about the rotational axis line as the center.

10. The position adjustment method according to claim 9, wherein the lower-half inside member is temporarily supported before supporting the rotating shaft part of the eccentric pin; the eccentric pin is rotated with the push rod with the lower-half inside member temporarily supported; after rotating the eccentric pin, the temporary support of the lower-half inside member is removed, and the rotating shaft part of the eccentric pin is supported at an end in the circumferential direction of the lower-half outside member.

* * * * *